United States Patent
Wechsler

(10) Patent No.: US 8,486,510 B2
(45) Date of Patent: Jul. 16, 2013

(54) INTEGRAL FRAME STRUCTURES

(76) Inventor: Lawrence I. Wechsler, Great Neck, NY (US)

( * ) Notice: Subject to any disclaimer, the term of this patent is extended or adjusted under 35 U.S.C. 154(b) by 1297 days.

(21) Appl. No.: 10/963,443

(22) Filed: Oct. 12, 2004

(65) Prior Publication Data
US 2005/0181175 A1  Aug. 18, 2005

Related U.S. Application Data

(60) Provisional application No. 60/510,346, filed on Oct. 10, 2003.

(51) Int. Cl.
*B32B 3/00* (2006.01)

(52) U.S. Cl.
USPC .............................. 428/156; 264/318; 446/87

(58) Field of Classification Search
None
See application file for complete search history.

(56) References Cited

U.S. PATENT DOCUMENTS

| | | | | |
|---|---|---|---|---|
| 4,154,296 A * | 5/1979 | Fijas | | 165/179 |
| 4,937,064 A * | 6/1990 | Gonzalez | | 423/613 |
| D318,506 S * | 7/1991 | Caranica | | D21/468 |
| 5,080,591 A * | 1/1992 | Forsyth | | 434/147 |
| 5,630,977 A * | 5/1997 | Catalanotti et al. | | 264/318 |
| 6,440,044 B1 * | 8/2002 | Francis et al. | | 482/114 |
| 2003/0022588 A1 * | 1/2003 | Silverglate | | 446/87 |
| 2003/0164439 A1 * | 9/2003 | Verbrugge | | 249/175 |

* cited by examiner

*Primary Examiner* — Michael J Felton
*Assistant Examiner* — Phu Nguyen

(57) ABSTRACT

A method allows production of integral frame structures having at least three structural portions separated circumferentially about a central axis and at least one hollow region radially inward thereof. Each of plural mold sections fits between structural potions, and a portion of the mold interior includes a wedge shaped portion which allows the mold sections to slide past the structural portions when molding is complete.

12 Claims, 5 Drawing Sheets

INTEGRAL FRAME STRUCTURES

CROSS REFERENCE TO RELATED APPLICATIONS

This application claims the benefit of U.S. Provisional Application No. 60/510,346 filed Oct. 10, 2003 entitled METHOD OF MANUFACTURING INTEGRAL FRAME STRUCTURES HAVING HOLLOW PORTIONS AND ARTICLES PRODUCED THEREBY.

BACKGROUND OF THE INVENTION

The present invention relates to a manufacturing method and article produced thereby, and more particularly to a method of manufacturing a three-dimensional structure having hollow portions and structures produced in accordance with the method.

In order to produce an integrally molded product, various molding techniques have been conventionally employed. Blow molding offers one way in which a hollow product is produced. In accordance with such approach, a "bubble" of plastic is expanded into a shaped mold cavity, thereby assuming a hollow form corresponding to the interior topography of the cavity walls. While effective for producing structures having a relatively thin wall, such as bottles and the like, blow molding cannot be used to produce structures having substantial thickness. The process is further limited to the extent that if openings in the hollow structure were desired, such as provided to form an open frame structure, an additional fabrication step would be required.

Rotational molding (roto-molding), a process which involves rotation of a mold to deposit molding material on an interior of a mold has been used to produce various hollow structures, but is also limited with regard to what materials can be used in the molding process, and generally involves relatively long cycle times. As with blow molding, finishing of the molded articles, particularly those with openings defining a frame structure, generally requires additional steps after molding.

Notwithstanding the above approaches, it has remained difficult heretofore to produce a structure having hollow inner portions which is integrally molded as a single part, particularly utilizing injection and compression molding techniques.

It would therefore be desirable to provide a method of molding structures having hollow interior portions which is applicable to injection molded and compression molding processes.

Accordingly, it is an object of the invention to provide a molding method for hollow articles of integral unitary structure which overcomes the drawbacks of the prior art, and which is applicable to injection and compression molding techniques.

It is a further object of the invention to provide an article of unitary structure which includes a hollow portion inward of a portion of the structure comprising the article.

SUMMARY OF THE INVENTION

In accordance with these and other objects of the invention, there is provided a method which permits the molding of three-dimensional articles which include at least one hollow region disposed radially inward of structure comprising the article.

Briefly stated, the method includes providing a mold for producing an article having at least three structural portions separated circumferentially from one another about a central axis of the article, the mold having a number of mold sections corresponding to the number of structural portions to be produced thereby. The article further includes at least one hollow region radially inward of at least one of the structural portions, the hollow region being formed during molding of the article by engagement of respective mold sections which serve to form the particular structural portion(s) having the hollow region inward thereof. The shape of the mold cavity corresponding to the structural portion associated with the hollow region allows the corresponding mold sections to be withdrawn after molding is complete, by permitting clearance, of that portion of each of the mold sections which mutually engages with the other to form the hollow region, past the structural portion which is radially outward of the hollow region, and which would otherwise impede movement of the mold section outwardly of the article. This is accomplished by providing a portion of the mold interior (and hence the article produced thereby), with a wedge portion having a wedge-shaped profile which faces radially inward towards the hollow region. Such wedge-shaped profile of the wedge portion is provided with an angle no larger than an angle described between the axes along which the respective mold sections are withdrawn after molding of the article, thereby allowing the structure of the mold which forms the hollow region of the article to slide past the structural portion of the article disposed radially outward thereof.

The above, and other objects, features and advantages of the present invention will become apparent from the following description read in conjunction with the accompanying drawings.

DETAILED DESCRIPTION OF THE PREFERRED EMBODIMENT

Figure 1:
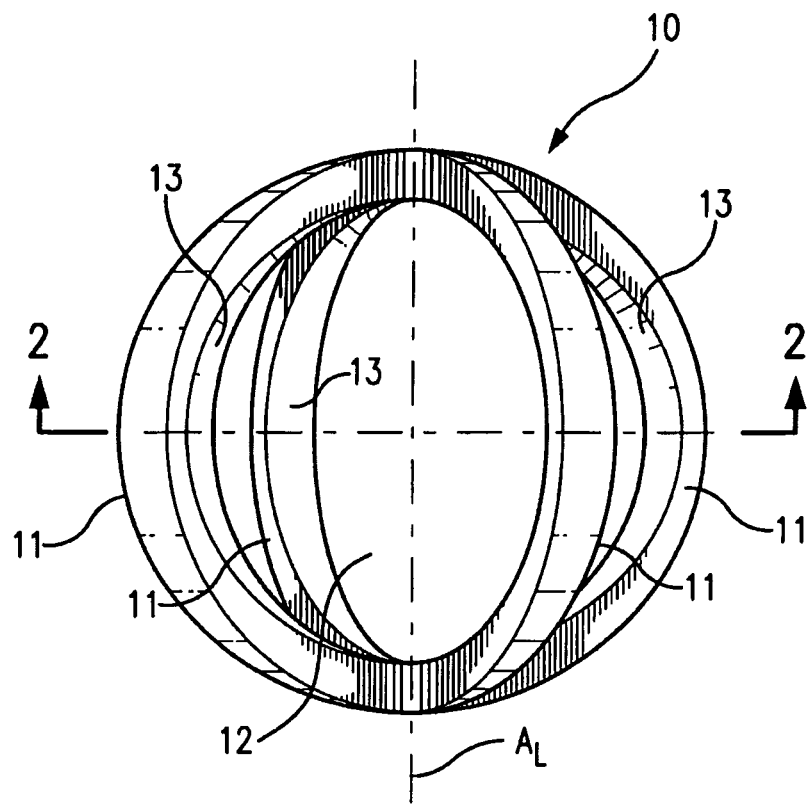
FIG. 1 is a perspective view of an example of an article having four circumferentially-spaced structural portions disposed radially outward of an inner hollow region which can be produced by the method according to the invention.
Figure 2:
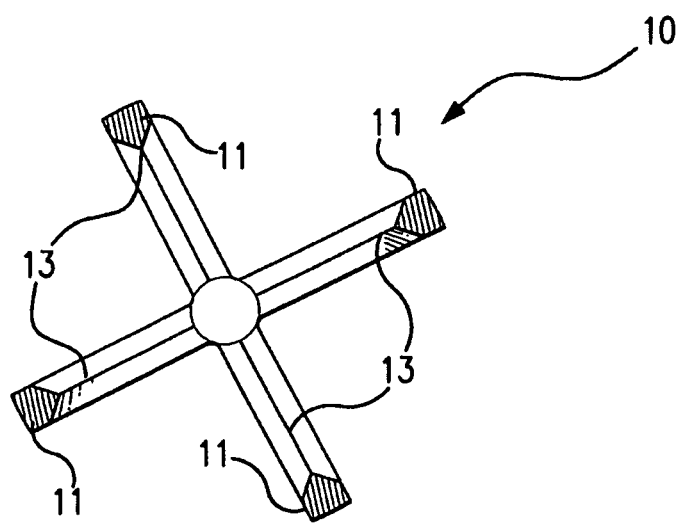
FIG. 2 is a cross-sectional view taken along line 2-2 of FIG. 1.

Referring now to FIGS. 1 and 2, an example of an article which can be produced according to the method of the invention is generally designated 10. Article 10 includes four circumferentially-spaced structural portions 11, and a hollow region 12 inward thereof. Structural portions 11 in the depicted example each meet at common poles aligned with a central axis $A_L$, however, the inventive method is not, by any means, limited to such arrangement. Each of the structural portions 11 includes a wedge portion 13 having a wedge-shaped profile which faces radially inward towards the hollow region 12. The purpose of this wedge portion 13, which lies at the heart of the invention, will be explained in detail below, with reference to description of the molding process used to form the depicted example of FIGS. 1 and 2, as well as a vast array of other structural articles which include hollow portions inward of solid structural portions of the article.

Figure 3:
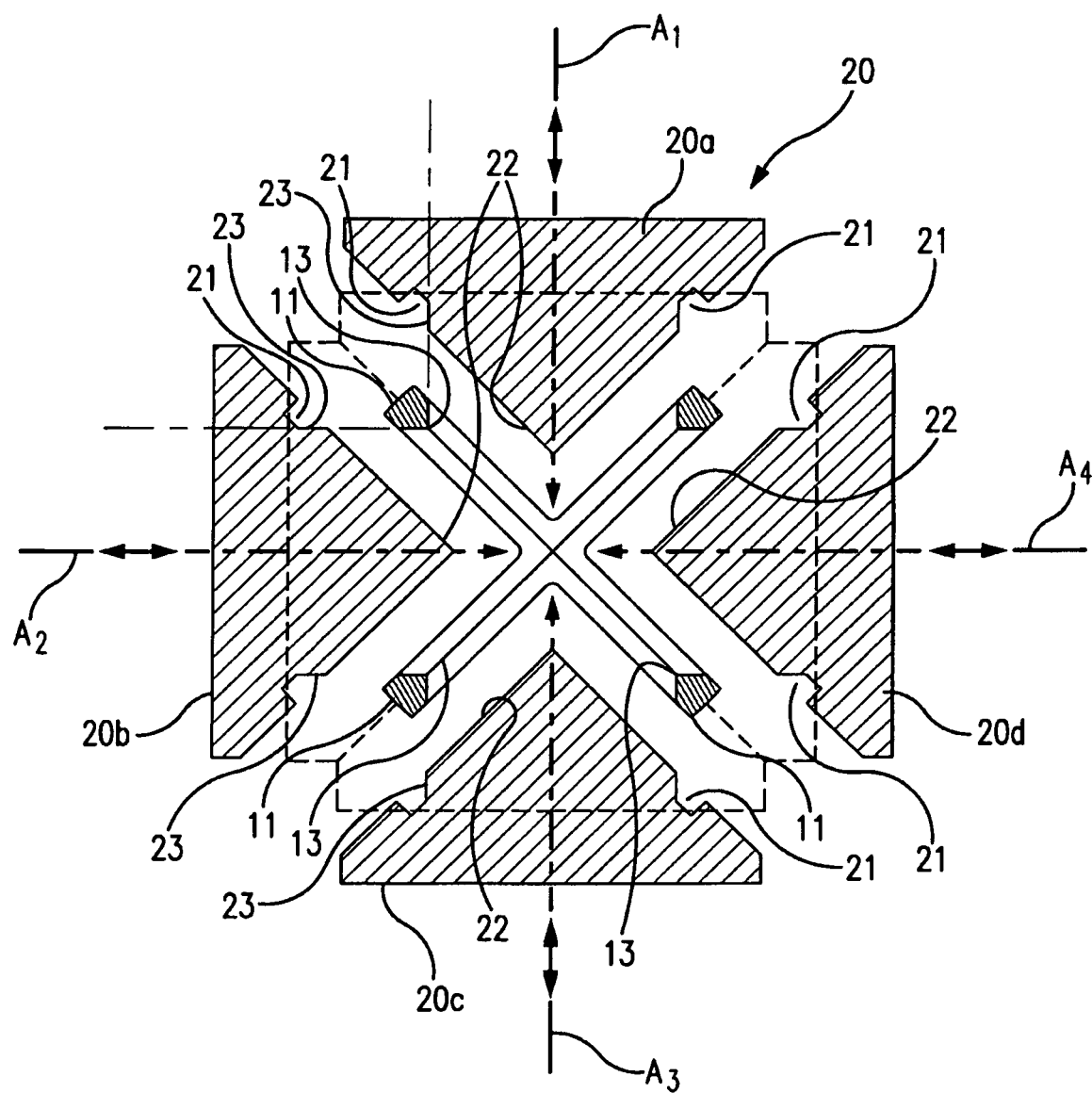
FIG. 3 is a cross-sectional schematic view of a mold for use in carrying out the method in accordance with the invention for producing the article example of FIG. 1.

Turning now to FIG. 3, a mold for producing the example of FIGS. 1 and 2, generally designated 20, is depicted for illustrative purposes only, and it will be understood that the principles employed with respect thereto can be applied by analogy to any other mold used to produce any other article of different configuration and shape. Mold 20 includes four mold sections 20a, 20b, 20c, 20d, corresponding in number to the number of structural portions 11 of article 10. Each of the mold sections 20a, 20b, 20c, 20d mutually engages an adjacent one thereof and adjacent pairs include cavity portions 21 which collectively define a mold cavity portion for producing a corresponding structural portion 11 of article 10.

The mold sections 20a, 20b, 20c, 20d are moved inwardly and outwardly along respective molding axes $A_1, A_2, A_3, A_4$ during mold cycling. As seen in the depicted example of FIG. 3, portions 22 of the mold sections 20a, 20b, 20c, 20d inward of the cavity portions 21 mutually engage during molding to prevent flow of molding material therebetween for formation of the hollow region 12. When molding is complete, the mold sections 20a, 20b, 20c, 20d are moved outwardly along molding axes $A_1, A_2, A_3, A_4$ to release the article 10 form the mold 20. Cavity portions 21 each includes a wall 23 which, collectively with another wall 23 of a cavity portion 21 of an adjacent one of the mold sections 20a, 20b, 20c, 20d, corresponds to the wedge-shaped profile 13 of the structural portion 11 of the article 10. As shown, the walls 23 of adjacent ones of cavity portions 21 are advantageously arranged at an angle to one another which is less than or approximately equal to an angle between the respective ones of the molding axes $A_1, A_2, A_3, A_4$. This permits the portions 22 of the mold sections used to form the hollow region 12 to be withdrawn past the structural portion 11 of the formed article 10 to allow removal of the article 10 from the mold 20.

It is noted that when the article 10 is molded from a resilient material which demonstrates some "give," the angle between the walls 23 of adjacent ones of cavity portions 21 may be a little larger than the respective ones of the molding axes $A_1, A_2, A_3, A_4$, since the structural portions will yield even though presenting an undercut. It is further noted that, although shown as defined by planar intersections, the wedge portions 13 can comprise curved surfaces as long as there is sufficient clearance to remove the mold sections 20a, 20b, 20c, 20d past the structural portions 11.

Figure 4:
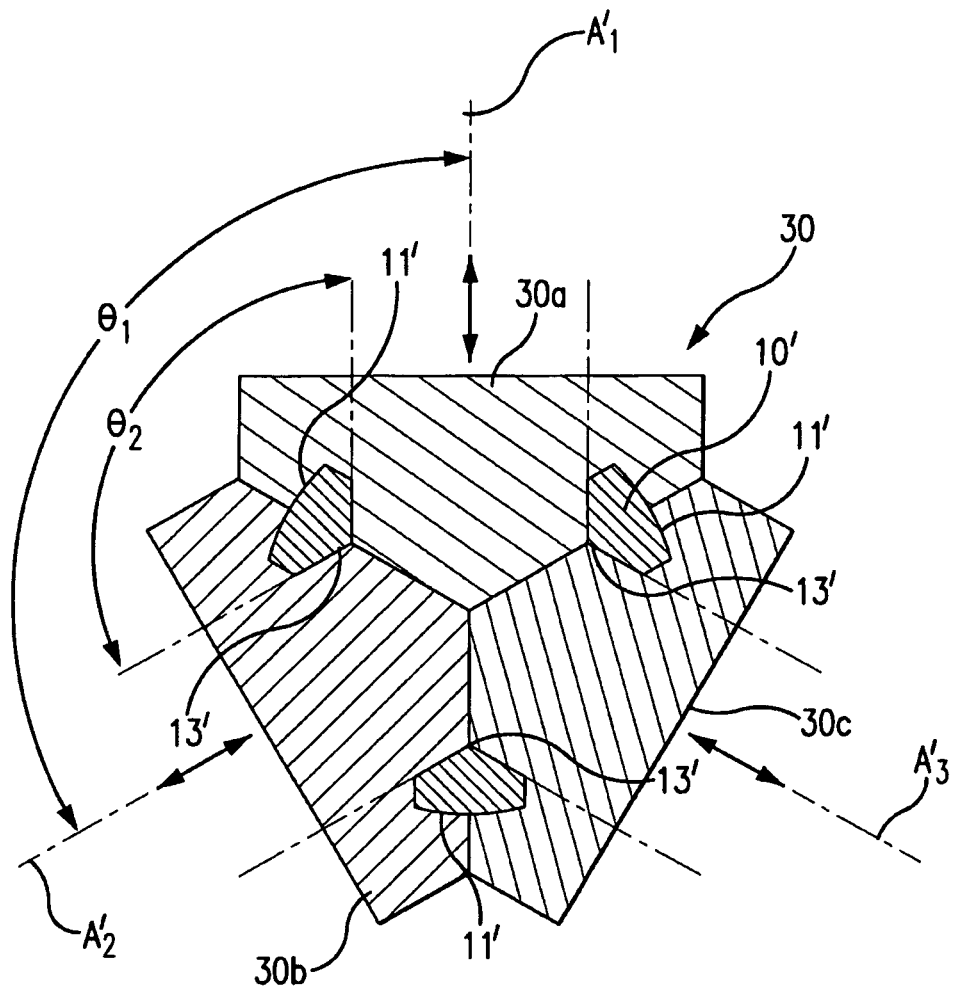
FIG. 4 is a cross-sectional schematic view of a mold for use in carrying out the method in accordance with the invention for producing an article having a structural form roughly analogous with that of FIGS. 1 and 2, but having three rather than four structural portions disposed outwardly of a hollow inner region.

Turning now to FIG. 4, another mold, designated 30, is directed to production of an article 10' which includes three structural portions 11'. In the depicted example, for simplicity of disclosure, the structural portions 11' of article 10' are circumferentially spaced by equal angular intervals. Each of the mold sections 30a, 30b, 30c move along respective molding axes $A'_1, A'_2, A'_3$ which are arranged at an angle $\theta_1$ to one another, where $\theta_1$ is equal to 120°. Therefore, in accordance with the invention, each of the structural portions 11' is provided with a wedge portion 13' presenting a wedge-shaped profile describing an angle $\theta_2$ which is less than or approximately equal to $\theta_1$ (assuming the material of the structural portion can not be appreciably compressed).

Figure 5:
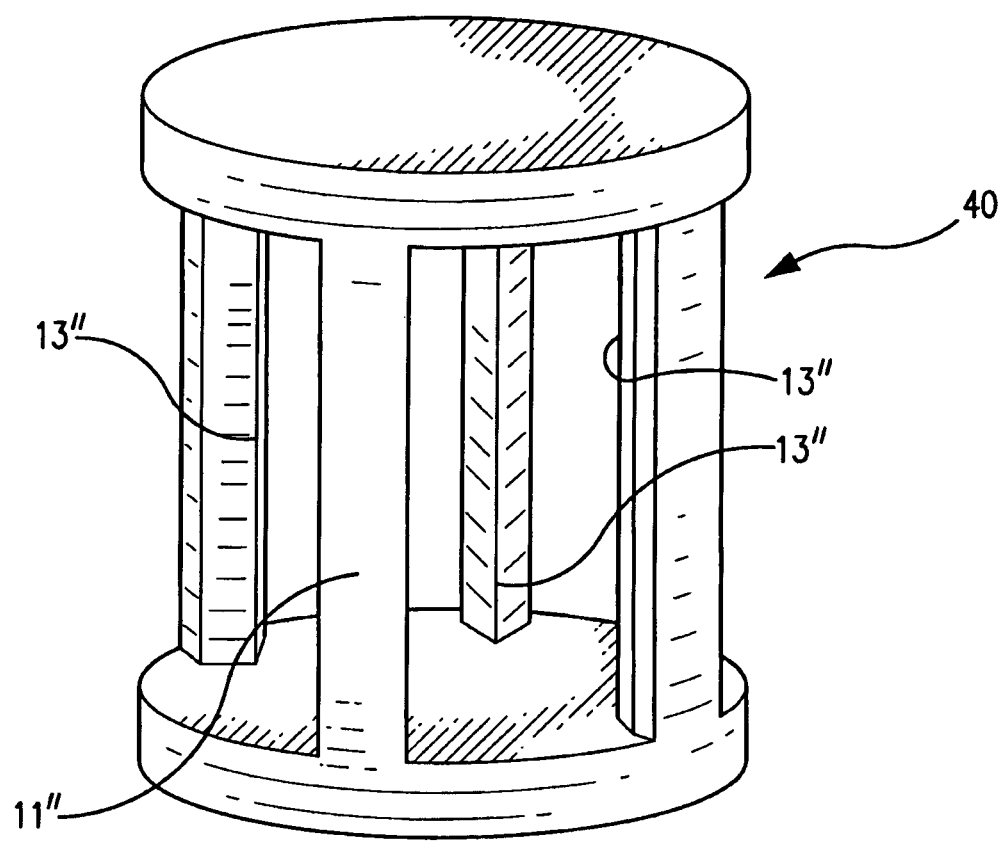
FIG. 5 is another example of an article which can be produced by the method in accordance with the invention.

While the aforementioned and described articles have a generally spherical shape, the invention is not limited to such configurations. For example, the article of FIG. 5, designated 40, can be produced by the method in accordance with the invention, provided the structural portions 11" are provided with wedge portions 13".

Figure 6:
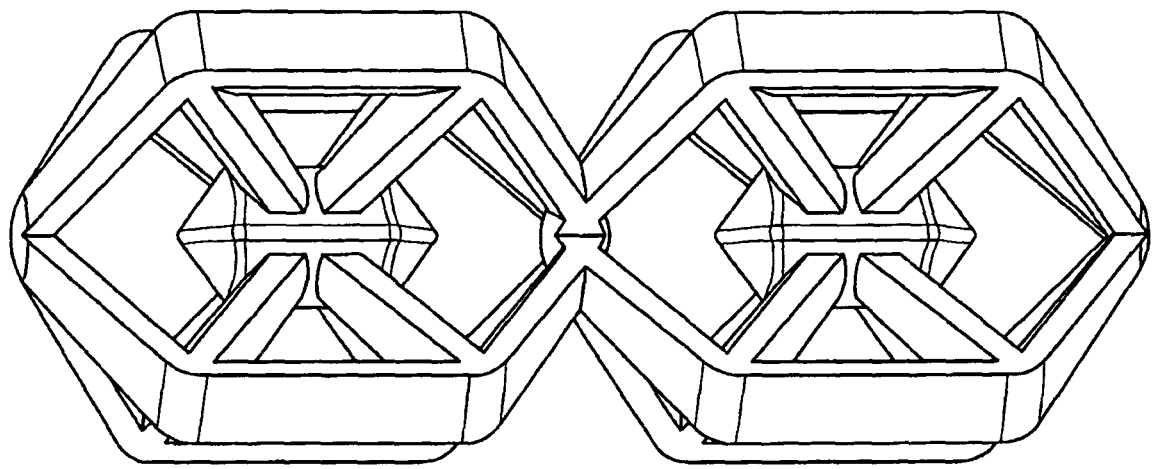
FIG. 6 is a perspective view of yet another example of an article which can be produced by the method in accordance with the invention.

The invention is also suitable for use in producing more complex structures, as shown for example in FIG. 6, and which employs the principles described above, i.e., the provision of wedge portions on the various structural portions radially outward of a hollow region.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A molded article, comprising:
a body including at least three structural portions, at least a portion of each of said at least three structural portions being located radially outward of a central article axis and spaced apart from one another about said central article axis by a respective gap between adjacent ones of said at least three structural portions; and
said body defining at least one hollow region located radially inward of said at least a portion of each of said at least three structural portions, said at least three structural portions each including at least one exposed region facing radially outward and a wedge portion having a wedge-shaped profile which tapers radially inward into the at least one hollow region, each said wedge-shaped profile including two tapered faces tapering from a widened region to intersect one another at an edge, said widened region being located radially outward of said edge, each said respective gap between the adjacent ones of said at least three structural portions radially extending at least between a radial position corresponding to said at least one exposed region and said edge of said wedge-shaped profile such that said hollow region is communicative with an exterior of said body radially outward of said at least three structural portions via each said respective gap, a pair of faces comprised of a one of said two tapered faces on each of adjacent ones of said at least three structural portions, which face each other, being oriented approximately radially parallel to one another or convergent in a radially inward direction.

2. A molded article according to claim 1, wherein axially opposed first and second ends of each of said at least three structural portions converge towards said central article axis so as to join one another respectively at first and second common spaced-apart axial positions along said central article axis.

3. A molded article according to claim 1, wherein said at least three structural portions include a total of four structural portions.

4. A molded article according to claim 1, wherein said at least three structural portions are substantially evenly spaced circumferentially.

5. A molded article according to claim 1, wherein said body is comprised of a resilient material.

6. A molded article according to claim 1, wherein said body includes an additional structural portion located radially inward of said hollow region.

7. A molded article, comprising:
an integrally molded three dimensional frame structure comprised of at least three structural portions which are spaced apart from one another about a reference axis extending through said three dimensional frame structure, said three dimensional frame structure including at least one hollow region, at least a portion of which is disposed radially inward of said at least three structural portions and radially outward of said reference axis, said at least three structural portions each including at least one exposed surface on a side of each of said at least three structural portions which faces radially outward and a wedge portion having a wedge-shaped profile which is tapered in a direction facing into the at least one hollow region, a one of said at least three structural portions being separated from adjacent ones of said at least three structural portions by gaps on respective sides of said one of said at least three structural portions, said at least one hollow region extending across said one of said at least three structural portions so as to be communicative with said gaps on both sides thereof, said gaps further being radially communicative with an exterior of said three dimensional frame structure, each said wedge-shaped profile including two opposed surfaces tapering from a widened region to intersect one another at an edge located radially inward of said widened region, a pair of facing surfaces comprised of a one of said two opposed surfaces on each of adjacent ones of said at least three structural portions being oriented, at least through a portion of an axially central region of said molded article, approximately radially parallel to one another or convergent in a radially inward direction.

8. A molded article according to claim 7, further comprising an additional structural portion located radially inward of said hollow region which is integrally molded with said three dimensional frame structure.

9. A molded article according to claim 7, wherein said at least three structural portions include a total of four structural portions.

10. A molded article according to claim 7, wherein:
said at least three structural portions are substantially evenly spaced-apart circumferentially; and
said at least three structural portions are generally symmetric about said reference axis.

11. A molded article according to claim 7, wherein said molded article is comprised of a resilient material.

12. A molded article according to claim 7, wherein axially opposed first and second ends of each of said at least three structural portions join one another respectively at first and second common spaced-apart axial positions along said reference axis.

* * * * *